United States Patent [19]

Zivkovic

[11] 4,165,819
[45] Aug. 28, 1979

[54] MOBILE EQUIPMENT FOR AIR-FLUSHING, FILLING AND VENTING A HYDRAULIC BRAKE SYSTEM

[75] Inventor: Milorad M. Zivkovic, Ostfildern, Fed. Rep. of Germany

[73] Assignee: JOMA-Maschinenbau Karl Jost, Tiefenbronn-Lehningen, Fed. Rep. of Germany

[21] Appl. No.: 808,642

[22] Filed: Jun. 21, 1977

[30] Foreign Application Priority Data

Jun. 22, 1976 [YU] Yugoslavia .......................... 1522/76

[51] Int. Cl.² .......................... B67D 5/02; B67D 5/54; B67D 5/64
[52] U.S. Cl. .................................. 222/61; 92/13.2; 222/67; 222/207; 222/383
[58] Field of Search ................ 92/13.2; 417/46, 211.5, 417/395; 222/20, 61, 67, 207, 209, 214, 334, 373, 380, 383, 385, 399, 608, 386.5

[56] References Cited

U.S. PATENT DOCUMENTS

| 1,823,406 | 9/1931 | Peaden | 222/399 X |
| 1,878,220 | 9/1932 | Willshaw et al. | 222/207 UX |
| 2,295,539 | 9/1942 | Beach | 222/399 |
| 2,509,570 | 5/1950 | Lee | 222/386.5 X |
| 2,735,589 | 2/1956 | Milster et al. | 222/608 X |

Primary Examiner—David A. Scherbel
Attorney, Agent, or Firm—Frishauf, Holtz, Goodman & Woodward

[57] ABSTRACT

A push-cart mounted tank body contains an annular compressed air tank encircling a coaxial brake fluid supply tank that is never under pressure in operation, superimposed on a hemispherical pressure chamber which on its flat bottom side is terminated by a flexible membrane. A float valve is provided which seals off the pressure chamber from the fluid container when it rises to its topmost position. A multipath selector valve on top of the device, in one position, provides for flushing out the brake fluid in the brake system of a vehicle being serviced with compressed air from the annular tank, in another position it provides for admitting compressed air below the flexible membrane of the pressure chamber to propel fresh liquid therefrom into the vehicle brake system, during which operation the float valve closes and the fluid in the pressure chamber, which is just enough to fill a brake system, is delivered under pressure to the vehicle system; in another position testing the tightness of the vehicle system by isolating the latter while observing the pressure therein on a manometer on the mobile equipment, and in still another position, decompressing system and the mobile equipment. Contact of compressed air with brake fluid is thereby minimized so as to avoid harmful absorption of atmospheric moisture.

20 Claims, 5 Drawing Figures

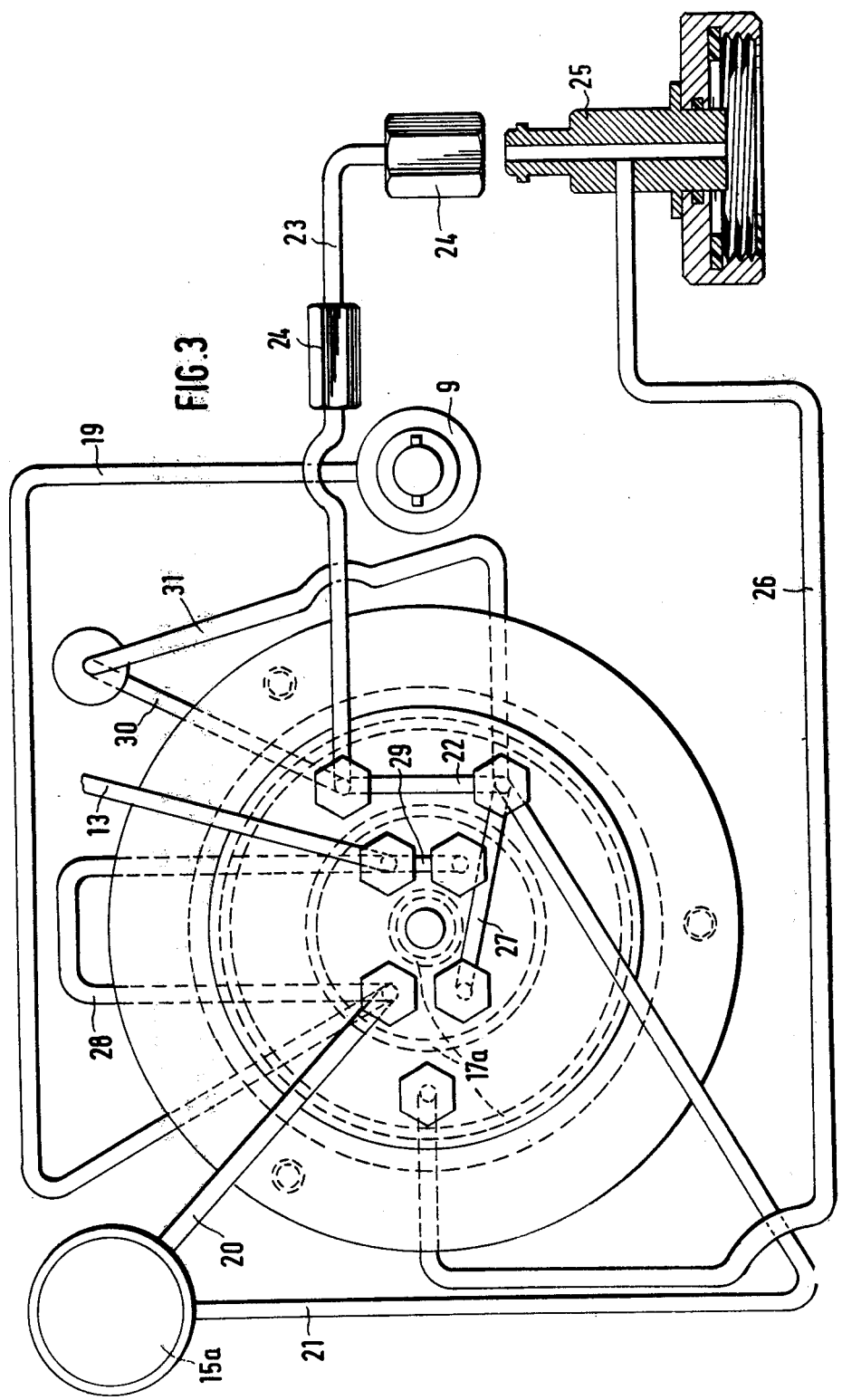

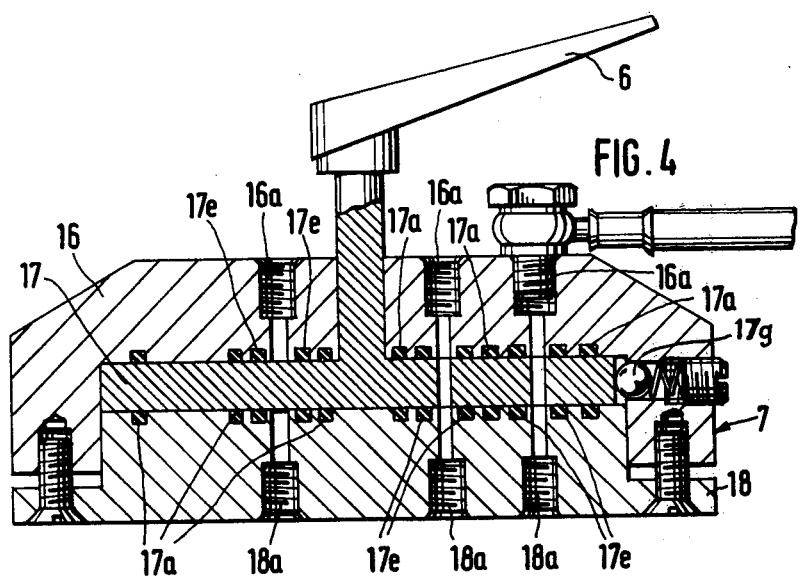
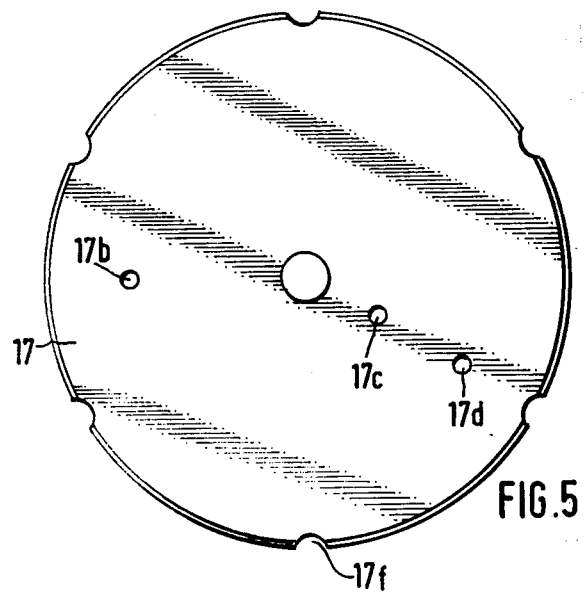

MOBILE EQUIPMENT FOR AIR-FLUSHING, FILLING AND VENTING A HYDRAULIC BRAKE SYSTEM

This invention relates to equipment for air-flushing, filling and venting a hydraulic brake system, particularly the hydraulic brake system of a motor vehicle. In particular, the invention concerns a wheel-mounted device with a container for brake fluid and a compressed air tank, so that the unit can be rolled up to a motor vehicle for servicing it.

There is a problem arising from the fact that brake fluid picks up moisture during the servicing operation when it is in contact with the atmospheric air to any great extent. It is known that the boiling point of the brake fluid used in hydraulic brake systems is significantly lowered by the taking up of even small quantities of water, a 2% water content bringing about a boiling point lowering of 60° K. The usual brake fluid consists of alcohol-like and hygroscopic materials similar to glycerin, so that when in contact with air, the brake fluid takes up the moisture from the air. The higher the pressure is at the time, the greater is the moisture pickup. In known devices for filling brake systems, the brake fluid stands for long periods of time under air pressure and can absorb moisture from the local air.

It is an object of the present invention to provide equipment for air-flushing, filling and venting a hydraulic brake system which enables the necessary maintenance work of a service station to be carried out quickly and surely and avoids any substantial moisture loading of the brake fluid.

SUBJECT MATTER OF THE INVENTION

Briefly, the brake fluid container of the service device is connected by an automatic valve to a pressure chamber of variable volume capable of being emptied by air pressure and the pressure chamber is connectible to the hydraulic brake system to be serviced through a multipath selector valve. Only a small quantity of brake fluid is held under pressure in the pressure chamber during the period of filling the brake system. The multipath selector valve makes possible a simple and quick operation of the device. In a preferred form, an elastic membrane in the pressure chamber prevents contact between the brake fluid in the pressure chamber and the air coming in from a compressed air tank to reduce the volume of the pressure chamber's liquid contents. In the description below the chamber on one side of the membrane is referred to as pressure chamber, although it could be referred to as a variable volume chamber. The membrane can, however, also be regarded as subdividing a pressure chamber into two variable volume portions, an actuating compressed-air chamber and a pressure-responsive liquid-holding chamber.

Other features of the device of the invention will be best understood after a detailed description.

The invention is accordingly further described by way of an illustrative example with reference to the annexed drawings, in which:

FIG. 3 is a diagram of the multiple path valve of the device of FIG. 1 and of the piping system of the device that is connected to it, including, in longitudinal section (side view), a fitting for connecting onto the hydraulic brake system to be serviced;

FIG. 4 is a sectional view of the multiple path valve of FIG. 3, the section being on a plane passing through the axis of the rotary control portion thereof, and FIG. 5 is a top view of the rotary control disk of the multiple path valve of FIGS. 3 and 4.

Figure 2:
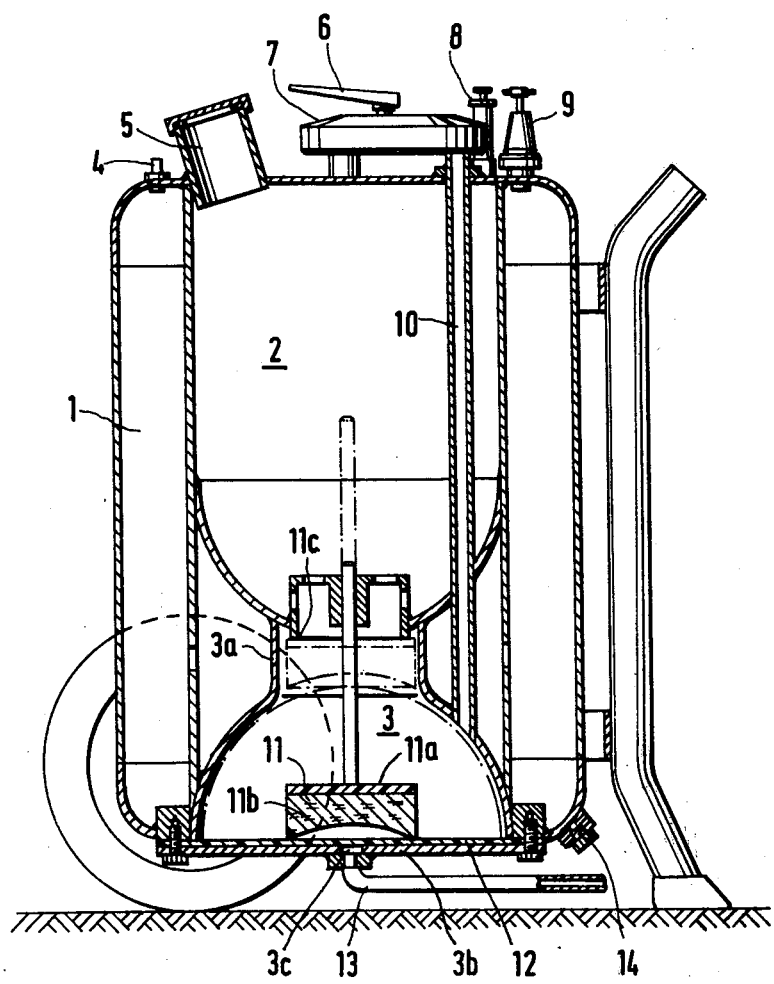
FIG. 2 is an elevation view, partly in section, of the equipment of FIG. 1.

The embodiment of the present invention shown in the figures is mounted in push-cart manner, as is most readily seen in FIG. 2, with a tank-like body that encloses an annular compressed air reservoir container 1 which surrounds both a coaxial brake fluid reservoir container 2 and a likewise coaxial pressure chamber 3 located below the brake fluid container 2. The compressed air container 1 can be filled with compressed air through a valve 4. The brake fluid container 2 can be filled with brake fluid through a short fill pipe 5. The cover of the brake fluid container 2 carries a multiple path valve 7 of the rotary disk type which can be actuated by a rotary lever handle 6. On the part of the top of the device that forms the top of the compressed air container 1 are located a safety valve 8 and a pressure regulator 9. The pressure regulator 9 serves to permit compressed air to flow at an adjustable constant pressure out of the compressed air tank 1 into the piping system of the device that is further described below.

The pressure chamber 3 is fastened to the brake fluid container 2 by means of a neck 3a and it is connected by a riser pipe 10 with the multiple path valve 7. The riser pipe 10 joins the pressure chamber 3 just outside the edge of the neck 3a and runs straight upward through the brake fluid container 2, then perpendicularly through the cover of that container, and finally to the multiple path valve 7.

The pressure chamber 3 is substantially hemispherical in shape and terminates against the flat bottom of the unit. It contains a float 11 that carries a seal disk 11a on its upper side and has an underside that is concave and of a curvature conforming with the hemispherical shape of the pressure chamber 3. When the float 11 is located in its uppermost position, which is inside the neck 3a, the seal 11a lies against an annular seat 11c and then the under surface 11b of the float 11 completes the hemispherical inner wall configuration of the pressure chamber 3. Along the bottom of the pressure chamber 3 is an elastic membrane 12 designed to be bulged upward. It is clamped on its edges against a bottom plate 3b, which has a central opening 3c equipped with a fitting for connection to a compressed air line 13. The membrane 12 prevents contact between the compressed air and the brake fluid. When the membrane 12 is bulged upward, the brake fluid admitted by gravity from the brake fluid container 2 into the pressure chamber 3 is pressed out through the riser pipe 10. The float 11, pressed upward when the chamber 3 fills, eventually presses its seal 11a against the seat 11c. When pressure is established in the pressure chamber 3, as the membrane 12 is bulged upward the seal 11a–11c is tightened, so that the pressure in the chamber 3 cannot be transmitted into the brake fluid container 2. At the same time, a backward flow of brake fluid into the brake fluid container 2 is prevented.

Figure 1:
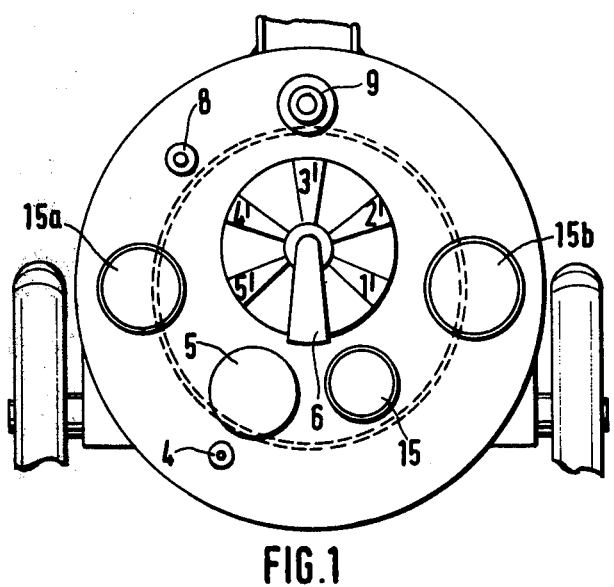
FIG. 1 is a plan view of an equipment for air-flushing, filling and venting the hydraulic brake system of a vehicle in accordance with the invention.

The compressed air container 1 has a screw-release outlet 14 located at the bottom of the container for drainage of condensation water. A brake fluid level indicator dial 15, a manometer 15a for measuring the pressure in the piping system of the device and a manometer 15b for measuring the pressure in the compressed air supply tank 1 are provided at the top of the device, above the brake fluid container 2 or the compressed air container 1, as the case may be, as shown in FIGS. 1 and 3.

The construction of the multipath selector valve 7 and its connection to the piping system of the device are shown in FIGS. 3,4 and 5. The casing of the multipath valve 7 consists of an upper part 16 and a lower part 18 between which a disk-shaped control plate 17 provided with seal rings 17a is mounted so as to be rotatable from the outside. The control disk 17 which is essentially circular in contour has three passage bores 17b, 17c and 17d, all parallel to the axis of rotation. The perforations 17c and 17d lie on a common radius at different distances from the center of the control disk. The perforation 17b has the same spacing from the control disk center as the perforation 17d, but is circumferentially spaced by more than 120° from the latter, corresponding to the offset shown in FIG. 3 between the respective connections for the tubes 31 and 26, these connections being shown in FIG. 3 by hexagonal outlines symbolic of a nut for tightening. Index notches 17f of semicircular contour are provided at 60° spacing around the circumference for seating an indexing ball 17g for indexing the control disk 17, so that the bores 17b, 17c and 17d, as the case may be, register with respective corresponding bores 16a in the upper casing part and 18a in the lower casing part, at the appropriate positions of the control disk explained below. Seal rings 17e are provided for the bores 16a and 18a.

In FIG. 5, the control disk is shown in an angular position designated in the following description as position 1'. By rotating the control disk 17 counterclockwise on its axis, the control disk and its handle 6 will successively assume the positions 2',3',4' and 5' as the indexing ball 17g seats in successive notches 17f. FIG. 1 shows the disposition of the corresponding angular positions of the handle 6.

The pressure regulator 9 connects the compressed air container 1 with the bore 18a through an air supply line 19. In the position 4' of the handle 6, the bore 18a connected to the air supply line 19 registers with the perforation 17c of the control disk 17. In this position 4' of control disk 17 and of the handle 6, the "air-flush" position, compressed air accordingly passes through a tube 20 to the manometer 15a and thence through a tube 21, a tube 22, a connection tube 23 with a quick coupling 24 and to a screw-on connection fitting 25 that can be screwed onto the top of a brake fluid supply tank of the brake system being serviced instead of its normal closure cover or cap. The screw-on fitting 25 communicates through a tubular line 26 to another bore 18a of the multipath valve 17 which registers in position 1' with the perforation 17b of the control disk 17, this position being the "decompression" position of the handle 6.

If after releasing an air vent screw of a wheel brake cylinder of the brake system, for example, the handle 6 is put into the position 4', inflowing compressed air coming through the connection line 23 into the brake system will expel brake fluid through the released vent screw. As soon as air instead of brake fluid begins to flow out, the vent screw is tightened again and another vent screw is loosened, and the foregoing procedure is then repeated. During this series of operations, the handle 6 remains continuously in the position 4'. After air-flushing by successive loosening of the vent screws of the brake cylinders is terminated, the handle is rotated clockwise into the position 3', which is the "seal test" position.

In the position 3' of the handle 6, all bores 16a and 18a are closed by the control disk 17. Consequently, in this position, the manometer 15a is connected through the lines 21,22 and 23 with the brake system that is now under pressure, so that the gas- and fluid-tight condition of the system can now be checked, the manometer 15a showing whether or not the pressure falls appreciably in the brake system when it is thus isolated.

After being moved over into the position 5', this being the "air release" position, the control disk 17 connects the lines 23,22 and 27, through the bore 17c with a bore 18a through which the compressed air can escape from the brake system. The tube 27 can therefore be called a "release" tube.

In order to fill the brake system with fresh brake fluid, the handle 6 must be brought into the position 2', which is the "fill" position. After that is done, the individual vent screws of the brake system are, in the usual way, each in turn opened and reclosed as soon as brake fluid begins to flow out of them. In the position 2' compressed air passes through the air supply line 19 and through a connecting tube 28, as well as through the bore 17c into the compressed air line 13, which passes around the device to the inlet 3c at the center of the bottom (FIG. 1). The pressure thus applied to the underside of the elastic membrane 12 causes the latter to bulge upwards until it comes to press against the hemispherical inner wall of the pressure chamber 3 and, of course, the underside 11b of the float 11. When the membrane 12 is fully distended upwards, substantially all the brake fluid originally in the pressure chamber 3 is driven into the brake system through the riser pipe 10, a brake fluid tube 30, the bore 17d in the control disk 17 and the connecting tube 23. After opening and closing of all vent screws, the brake system is then filled with brake fluid and is ready to be tested for seal tightness in the filled condition by rotation of the handle 6 into the position 3' and observation of the manometer 15a.

The brake fluid supply tank of the brake system and the pressure chamber 3 of the service device can be decompressed by rotation of the handle 6 into the position 1'. When that is done, the compressed air in the intermediate space between the elastic membrane 12 and the bottom plate 3b escapes through the opening 3c, the compressed air line 3, a discharge tube 29 and the bore 17c of the control disk of the multipath valve, escaping by that path into the open air. At the same time, brake fluid can flow back through the bore 17d of the control disk and a return flow pipe 31 out of the piping system into the brake fluid container 2, and this operation can be monitored by observing the manometer 15a. Air, which has up to now been contained under pressure in the brake fluid tank of the brake system, can flow out through the bore 17b of the control disk 17 and through the pipe 26.

During decompression, the membrane 12 and the float 11 drop back to the floor support 3b of the pressure chamber 3. Brake fluid can now flow by gravity out of the brake fluid container 2, so that the float 11 rises far enough to stay with its seal 11a against the seat 11c.

Since the contents of the brake fluid container 2 are not under pressure, this container can be filled at any time to make up for fluid dispensed. A single control handle 6 is sufficient to operate the device, so that maintenance work on brake systems can be carried out simply and quickly. Moreover, the device of the present invention provides the greatest possible measure of safety, because the squirting of brake fluid in the filling of a vehicular brake system is prevented and the pick-up of atmospheric moisture from the compressed air is minimized by the presence of the membrane 12. Only the quantity of brake fluid required in a particular filling is put under pressure and that only for the short time required to fill the brake system.

Although the invention has been described with reference to a particular illustrative example, it will be understood that modifications and variations are possible within the inventive concept.

I claim:

1. Equipment for air-flushing, filling and venting a hydraulic brake system, particularly of a motor vehicle, comprising, in a combined unit, a brake fluid container (2) and a compressed air container (1) and further comprising:
   a pressure chamber (3) of variable volume:
   a float valve (11,11a,11c) responsive to the level of brake fluid in said pressure chamber as well as to the volume of said pressure chamber and disposed so that said brake fluid container (2) is connected through said valve with said pressure chamber (3) except when said variable valve pressure chamber is substantially filled with brake fluid
   a multipath selector valve (7), and
   means for connecting said pressure chamber through said multipath valve to a hydraulic brake system to be serviced, said multipath valve being also connected so as to control the application of compressed air from said compressed air container to said pressure chamber.

2. Equipment as defined in claim 1, in which an elastic membrane (12) is provided for varying the volume of said pressure chamber in response to applied compressed air of said chamber and for expelling the contents thereof.

3. Equipment as defined in claim 2, in which said pressure chamber (3) is of substantially hemispherical shape.

4. Equipment as defined in claim 3, in which said float valve comprises a float (11) having an underside (11b) concavely shaped so as to conform with the shape of the inside wall of said pressure chamber (3).

5. Equipment as defined in claim 4, in which said pressure chamber (3) is of hemispherical shape except for an adjoining neck (3a) the top thereof for accepting said float (11) in the uppermost position of the latter.

6. Equipment as defined in claim 2, in which said pressure chamber has a lateral wall structure in contact at a lower edge with said membrane and said membrane (12) is sealed at its periphery between the lateral wall and a bottom plate 3b) so as to provide an expandable air chamber in space between said membrane and said bottom plate, and in which said multipath valve (7) is arranged to control the introduction of compressed air between said elastic membrane (12) and said bottom plate (3b).

7. Equipment as defined in claim 1, in which said multipath valve (7) is constituted and connected so that in at least one position thereof it can inject compressed air from said compressed air container (1) into the hydraulic brake system to be tested.

8. Equipment as defined in claim 1, in which the maximum volume of said pressure chamber (3) is substantially just sufficient for holding the quantity of brake fluid necessary for a single filling of a brake system to be serviced.

9. Equipment as defined in claim 1, in which said brake fluid container (2) and said pressure chamber (3) are arranged one above the other.

10. Equipment as defined in claim 1, in which said brake fluid container (2) and said pressure chamber (3) are arranged coaxially and are mounted coaxially within said compressed air container (1).

11. Equipment as defined in claim 1, in which a riser tube (10) is provided which runs from said pressure chamber (3) at a location inwards from said compressed air container (1), through said brake fluid container (2) and to said multipath valve (7).

12. A combined equipment unit for air flushing, fillingand venting a hydraulic brake system, particularly of a motor vehicle, having a compressed-air reservoir (1), a pressure chamber (3) which is subdivided by a movable partition (12) into a pressure-responsive liquid-holding chamber and a compressed-air chamber, and an externally controllable valving device (7) through which said pressure-responsive liquid-holding chamber is connectable with said hydraulic brake system and said compressed-air chamber is connectable with said compressed-air reservoir, and further comprising:
   a brake fluid reservoir (2) located above said pressure-responsive liquid-holding chamber for holding a supply of brake fluid at atmospheric pressure, and
   a valve (11,11a,11c), provided between said brake fluid reservoir and said pressure-responsive liquid-holding chamber, responsive to the liquid-fill condition of said pressure-responsive liquid-holding chamber, for closing the connection of said last-mentioned chamber, when it is filled, with said brake fluid reservoir,
   the fillable volume of said pressure-responsive liquid-holding chamber corresponding at least approximately to the filling volume of said hydraulic brake system.

13. A combined unit as defined in claim 12, in which said movable partition is a flexible membrane (12) capable of being bulged upward within the interior of said pressure chamber (3) by compressed air introduced into said compressed-air chamber through said valving device (7).

14. A combined unit as defined in claim 13 in which said pressure chamber (3) is substantially hemispherically shaped.

15. A combined unit as defined in claim 12 in which said valve (11,11a,11c) provided between said brake fluid reservoir and said pressure-responsive liquid-holding chamber is a float valve.

16. A combined unit as defined in claim 15 in which said pressure chamber (3) is of domed shape and in which said float valve comprises a float (11) having an underside (11b) concavely shaped so as to conform with the domed shaped of the inside wall of said pressure chamber (3).

17. A combined unit as defined in claim 16, in which said pressure chamber (3) is of hemispherical shape except for an adjoining neck (3a) the top thereof for accepting said float (11) in the uppermost position of the latter.

18. A combined unit as defined in claim 16, in which said brake fluid reservoir (2) and said pressure chamber (3) are arranged coaxially and are mounted coaxially within said compressed-air reservoir (1).

19. A combined unit as defined in claim 18, in which said externally controllable valving device is a multipath slide valve and in which a riser tube (10) connected to pressure-responsive liquid-holding chamber of said pressure chamber (3), extends inside said compressed-air reservoir (1) through said brake fluid reservoir (2) to said externally controllable valving device (7).

20. A combined unit as defined in claim 12 in which said hydraulic brake system has a brake-fluid supply container and in which said externally controllable valving device (7) is connected by a normally blocked element of said valving device to a connecting tube (26) leading to the upper portion of said brake-fluid supply container of said hydraulic brake system, said normally blocked element being arranged so that in the position (1') of said valving device (7) provided for venting off the air from said compressed-air chamber said connecting tube (26) is vented to the atmosphere.

* * * * *